SERVO POSITIONING SYSTEM FOR MAGNETIC DISC MEMORY
Filed Dec. 17, 1963
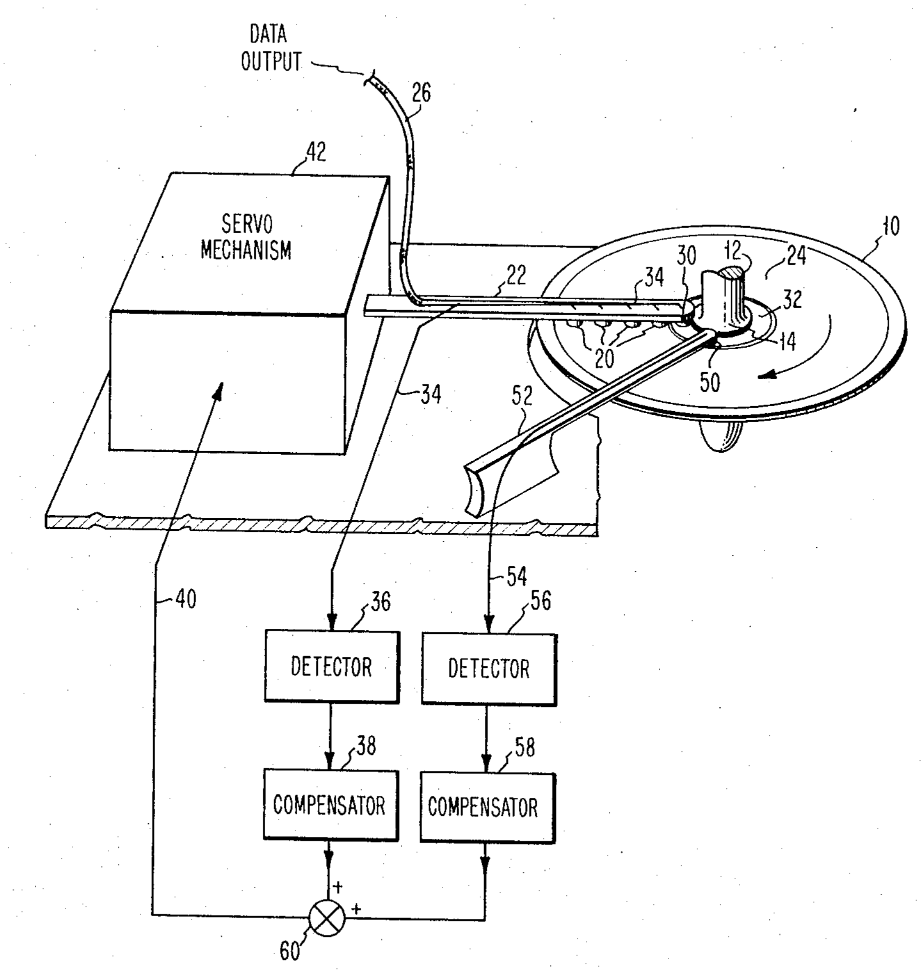
INVENTORS
JOSEPH T.S. MA
PAUL K.C. WANG
BY John H. Holcombe
AGENT 3,362,021
Patented Jan. 2, 1968

3,362,021

SERVO POSITIONING SYSTEM FOR MAGNETIC DISC MEMORY

Joseph T. S. Ma, San Jose, and Paul K. C. Wang, Mountain View, Calif., assignors to International Business Machines Corporation, New York, N.Y., a corporation of New York Filed Dec. 17, 1963, Ser. No. 331,139
7 Claims. (Cl. 340—174.1)

ABSTRACT OF THE DISCLOSURE

Servo apparatus for accurately following a servo track on a moving surface. The track possesses a degree of runout from a nominal position. A first transducer is mounted on a movable arm to indicate its lateral direction and distance from the center of the servo track. The movable arm is positioned laterally with respect to the servo track by a servo motor. A second transducer is mounted on a fixed arm at the nominal position of the servo track and senses its lateral direction and distance from the servo track. The second transducer is positioned ahead of the first transducer by a distance such that its output is produced at an advanced time equal to the inherent time lag of the servo system to exactly compensate for the time lag. The servo motor is therefore operated in accordance with the arithmetic sum of predetermined proportions of the error signals provided by the transducers.

The present invention relates to servo tracking systems and, more particularly, to curve or track following servo apparatus.

There are numerous applications for curve following servo systems wherein a high degree of accuracy is desirable. One such application arises in magnetic disc file systems where the discs are interchangeable. Although the discs are carefully made, a recorded disc cannot be removed from and be replaced on a machine spindle without destroying the concentricity of the data tracks with the spindle. This produces an amount of runout which is slight but which must be compensated for in order to utilize high density recording techniques. In such techniques, the data tracks are extremely narrow and close together, so that runout may cause loss of the data signal at a reading head and may cause the head to read data from the wrong track.

Previously, various servo systems have been developed to attempt to make the data heads follow the data tracks. For example, a set of servo data is recorded concentric to the data tracks and a read head is placed over the servo track on the same arm as the data heads. The output of the servo read head provides an indication of the instantaneous amount and direction of runout which is used to drive a servo apparatus to compensate for the runout. Although this technique greatly improves the tracking of the data head, the response of the servo apparatus to the servo signal is not instantaneous. A small, but irreducible time lag in the servo system prevents exact compensation for runout and prevents the use of high track densities.

It is therefore an object of the present invention to provide a servo apparatus which is capable of exactly following a curve or track.

It is another object of the present invention to provide a servo apparatus which is capable of exactly following a servo track recorded on a magnetic surface.

An additional object of the present invention is to provide a servo apparatus which detects the amplitude and direction of runout of a servo track sufficiently in advance to compensate for the time lag inherent in a servo system.

A further object of the present invention is to provide servo apparatus which accurately maintains a data read head or heads directly over the associated data track or tracks.

Briefly, in accordance with the present invention there is provided a servo track, a first sensing means for indicating its lateral direction and distance from the center of the servo track, actuating means for positioning the first sensing means, a second sensing means positioned along the servo track ahead of the first sensing means for sensing its lateral direction and distance from the center of the servo track, and control means for operating the prime mover in accordance with the arithmetic sum of predetermined proportions of the indications provided by the first and second sensing means.

The foregoing and other objects, features, and advantages of the invention will be apparent from the following more particular description of a preferred embodiment of the invention, as illustrated in the accompanying drawing.

The figure is a block diagram of the preferred embodiment of the invention.

Referring to the figure, there is shown a curve-following servo apparatus as used with a magnetic disc data storage system. A disc 10 is made of non-magnetic material and having a surface coating of a suitable magnetic material, such as any one of the magnetic oxides commonly used. Disc 10 is removably mounted on spindle 12 and against flange 14. The disc is positioned by placing the top of the disc in contact with flange 14 and is secured by means of a friction clamp (not shown) which is placed against the bottom surface of the disc. The disc may be removed by releasing the friction clamp and moving the disc down and off the blunt end of the spindle 12.

Electromagnetic transducers 20 are fixedly mounted on servo arm 22 and, with the disc 10 in its proper position against flange 14, they are equally spaced from disc 10. Spindle 12 rotates disc 10 at a constant rotational speed so that transducers 20 co-operate with an associated portion 24 of the magnetic coating on disc 10 for recording and/or reproducing data thereon. Transducers 20 may be of any suitable type adapted to record and/or reproduce data on the surface of disc 10. Transducers 20 may be provided with windings which produce output signals on conductors 26. These output signals are then supplied to some type of utilization apparatus.

Another transducer 30 is fixedly mounted on arm 22, spaced from disc 10, and co-operates with the magnetic surface 32 on disc 10 to reproduce data therefrom. The data appearing on magnetic surface 32 comprises a servo track such as that disclosed in co-pending application Ser. No. 245,572, assigned to the above assignee by Frank J. Sordello, and filed Dec. 18, 1962. As shown by that application, the servo track comprises two, low frequency, linearly-recorded sine waves written in concentric, circular tracks. The two sine waves are of different frequencies and the center of the servo track is the dividing line between the two adjacent sine waves. Transducer 30 is of sufficient bandwidth to reproduce both frequencies with equal amplitude and supply the same over line 34 to detector 36. The detector is the circuitry shown in the above-mentioned application, which separates the two frequencies, detects the peak amplitudes of each frequency, providing a D.C. signal representative of the amplitude of each frequency, and subtracts one of the amplitudes from the other in a D.C. summing amplifier. These operations produce a D.C. output signal, the amplitude of which indicates the distance of transducer 30 from the center of the servo track, and the sign of which indicates the direction of the transducer from the center of the servo track. If the transducer is centered over the servo track, the output of detector 36 will indicate a null value of 0 volts D.C. The D.C. output signal is then supplied to compensator 38 which includes an adjustable voltage divider network, allowing manual adjustment of the feedback gain to obtain the desired response of the system. The output of compensator 38 is supplied on line 40 to servo mechanism 42, and the servo mechanism positions arm 22 in accordance with the received signal on line 40.

The system thus described is similar to those of the prior art wherein no compensation is made for the time lag inherent in the servo system.

In accordance with the invention, there is provided another transducer 50 which is fixedly mounted on arm 52. Transducer 50 is spaced from disc 10 and co-operates with the magnetic surface 32 on disc 10 to reproduce the servo data thereon in the same manner as transducer 30. However, arm 52 is stationary; thus, transducer 50 reproduces servo signals which indicate the instantaneous position of the servo track with respect to a fixed point. The output of transducer 50 is supplied on line 54 to detector 56. Detector 56 is identical to detector 36. Thus, detector 56 provides a D.C. output, the amplitude and sign of which indicate, respectively, the lateral distance and direction of fixed point 50 from the center of the servo track. The output of the detector is supplied to compensator 58 which is similar to compensator 38, having an adjustable voltage divider network to adjust the feedback gain for best operation of the system. The outputs of compensator 38 and compensator 58 are supplied to a D.C. summing amplifier 60, where the two signals are arithmetically added to provide a net or total servo signal on line 40. This net or total servo signal operates servo mechanism 42 to position movable arm 22 so that transducer 30 is directly over the center of the servo track, thereby aligning transducers 20 directly over this associated data tracks.

In operation, a pre-recorded disc 10 is placed over spindle 12 and against flange 14. The disc is secured against the flange by means of a friction clamp, and spindle 12 then rotates the disc at a constant rotational speed.

At that time, transducer 30 will probably not be properly centered over the servo track 32. Therefore, the data then read by transducer 30 and supplied on line 34 to detector 36 will result in a non-zero output from the detector to compensator 38 and D.C. summing amplifier 60.

Transducer 50 will also read the servo track and provide a signal to detector 56. The output of detector 56 and compensator 58 indicates the instantaneous amount and direction of runout of the servo track with respect to the center of spindle 12. The output of compensator 58 will also be supplied to D.C. summing amplifier 60.

The summing amplifier supplies the net or total arithmetic sum of the signals received from compensator 38 and compensator 58 to servo mechanism 42 on line 40. The servo mechanism moves arm 22 in response to the signal received on line 40.

After approximately one revolution of disc 10, the servo mechanism will have positioned transducer 30 over the center of the servo track. This will result in the output of compensator 38 reaching a null or zero value. Henceforth, the amount of runout detected by transducer 50 and detector 56 will be the sole signal transmitted by summing amplifier 60 over line 40. Since transducer 50 is spaced by arm 52 ahead of transducer 30 by a distance such that the time required for a radius of disc 10 to move from servo head 50 to transducer 30 is equal to the time lag in the servo system, the movement of arm 22 by servo mechanism 42 in response to the signal on line 40 will maintain transducer 30 directly over the center of servo track 32. Also, since the data tracks recorded on the magnetic surface 24 of disc 10 are concentric with the servo track 32, the above-described movement of arm 22 will maintain the exact position of transducers 20 over the associated data tracks.

The invention is not restricted to a single servo track but may be used with any number of servo tracks wherein means, such as the address register disclosed in the above-mentioned application Ser. No. 245,572, are provided for keeping track of the various servo tracks. In addition, the invention is not limited to a disc system having magnetically recorded signals thereon, but may be used in any servo system where the delay inherent in the servo system is a problem, and the track to be followed can be sensed in advance of the follower arm or means.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Servo apparatus for following a servo track comprising:
   - a first sensing means for indicating the direction and distance of said first sensing means from the center of said servo track;
   - actuating means, having an input, for positioning said first sensing means in response to signals received at said input;
   - a second sensing means fixedly positioned along a servo track ahead of said first sensing means for indicating the direction and distance of said second sensing means from the center of said servo track; and
   - control means for providing signals at said input to said actuating means in accordance with the arithmetic sum of predetermined proportions of the indications provided by said first and second sensing means.

2. Servo apparatus for following a servo track comprising:
   - a first sensing means for indicating the direction and distance of said first sensing means from the center of said servo track;
   - a prime mover for creating relative movement of a constant speed of said servo track with respect to said first sensing means;
   - actuating means, having an input, for positioning said first sensing means laterally to said relative motion in response to signals received at said input;
   - a second sensing means fixedly positioned as to motion lateral to said relative motion between said first sensing means and said servo track, said second sensing means being maintained along said servo track ahead of said first sensing means by a distance such that an increment of said servo track detected by said second sensing means will reach said first sensing means a delayed time later, which time is equal to the inherent time lag of said servo apparatus, said second sensing means indicating the lateral direction and distance of said second sensing means from the center of said servo track; and
   - control means for providing signals at said input to said actuating means in accordance with the arithmetic sum of predetermined proportions of the indications provided by said first and second sensing means.

3. Servo apparatus for following a circular servo track lying in a single plane, comprising:
   - prime mover means for rotating said servo track at a constant rotational speed about an axis, said axis being essentially perpendicular to said plane and said axis piercing said plane within the circle formed by said servo track;
   - a first sensing means for indicating the radial direction and distance of said first sensing means from said servo track;
   - actuating means having an input for positioning said first sensing means radially with respect to said axis in response to signals received at said input;

a second sensing means fixedly positioned along a radius about said axis ahead of, with respect to the motion of said servo track, said first sensing means for indicating the radial direction and distance of said second sensing means from said servo track; and control means for providing signals at said input to said actuating means in accordance with the arithmetic sum of predetermined proportions of the indications provided by said first and second sensing means.

4. Servo apparatus for following a circular servo track recorded on a magnetic surface of a circular disc, comprising:

prime mover means for rotating said disc at a constant rotational speed about an axis, said axis being essentially perpendicular to the magnetic surface of said disc and said axis piercing said disc within the circle formed by said servo track;

a first sensing means for indicating the radial direction and distance of said first sensing means from said servo track;

actuating means having an input for positioning said first sensing means radially with respect to said axis in response to signals received at said input;

a second sensing means fixedly positioned along said servo track ahead of said first sensing means by a distance such that an increment of said servo track detected by said second sensing means will reach said first sensing means a delayed time later, which time is equal to the inherent time lag of said servo apparatus, said second sensing means indicating the radial direction and distance of said second sensing means from said servo track; and control means for providing signals at said input to said actuating means in accordance with the arithmetic sum of predetermined proportions of the indications provided by said first and second sensing means.

5. In combination:

a first transducer;

a magnetic recording surface spaced from said transducer and movable relative thereto;

a servo track recorded on said magnetic recording surface, said transducer reading the portion of said servo track instantaneously beneath said transducer and providing an output signal in response thereto;

electrical detecting means connected to said transducer for detecting said output of said transducer and thereby indicating the direction and distance of said first transducer from the center of said servo track;

actuating means, having an input, for positioning said first transducer laterally with respect to said servo track in response to signals received at said input;

a second transducer, similar to said first transducer, fixedly positioned as to motion lateral to said servo track, said second transducer being maintained along said servo track ahead of said first transducer, said second transducer reading the portion of said servo track instantaneously under said second transducer and providing an output signal in response thereto;

second electrical detecting means for detecting said output of said second transducer to thereby indicate the lateral direction and distance of said second transducer from the center of said servo track; and control means for providing signals at said input to said actuating means in accordance with the arithmetic sum of predetermined proportions of the indications provided by said first and second detecting means.

6. A transducer positioning servo system for a magnetic disc memory comprising:

a magnetic recording disc having two adjacent concentric, circular servo tracks in the form of linearly-recorded sine waves;

a first transducer for simultaneously reading the two adjacent servo tracks;

first detecting circuitry for separating and comparing the servo signals read by said first transducer to develop a position error signal;

actuating means, having an input, for positioning said first transducer laterally with respect to said two adjacent servo tracks in response to signals received at said input;

a second transducer for simultaneously reading said two adjacent servo tracks, said second transducer being fixedly positioned as to motion lateral to adjacent servo tracks;

second detecting circuitry for separating and compaaing the servo signals read by said second transducer to develop a second position error signal; and control means for providing signals at said input to said actuating means in accordance with the arithmetic sum of predetermined proportions of the position error signals provided by said first and second detecting circuitry.

7. A transducer positioning servo system for a magnetic disc memory comprising:

a magnetic recording disc having two adjacent, concentric, circular servo tracks in the form of linearly-recorded sine waves;

a prime mover for rotating said magnetic recording disc at a constant rotational speed about an axis, said axis being essentially perpendicular to the surface of said disc upon which are recorded the servo tracks, and said axis piercing said disc within the circle formed by said servo tracks;

a first transducer for simultaneously reading the two adjacent servo tracks;

first detecting circuitry for separating and comparing the servo signals read by said first transducer to develop a position error signal;

actuating means, having an input, for positioning said first transducer radially with respect to said axis in response to signals received at said input;

a second transducer for simultaneously reading said two adjacent servo tracks, said second transducer being fixedly positioned along said servo tracks ahead of said first sensing means by a distance such that an increment of said servo tracks detected by said second sensing means will reach said first sensing means a delayed time later, which time is equal to the inherent time lag of said transducer positioning servo system;

second detecting circuitry for separating and camparing the servo signals read by said second transducer to develop a second position signal; and summing means for providing signals at said input to said actuating means in accordance with the arithmetic sum of predetermined proportions of the position error signals provided by said first and second detecting circuitry.

No references cited.

BERNARD KONICK, *Primary Examiner.*

R. SNIDER, *Assistant Examiner.*